United States Patent
Bialecki et al.

(10) Patent No.: US 12,482,551 B2
(45) Date of Patent: Nov. 25, 2025

(54) METHODS FOR OPERATING AN EVALUATION SYSTEM FOR MEDICAL IMAGE DATA SETS, EVALUATION SYSTEMS, COMPUTER PROGRAMS AND ELECTRONICALLY READABLE STORAGE MEDIUMS

(71) Applicant: Siemens Healthineers AG, Forchheim (DE)

(72) Inventors: Piotr Bialecki, Forchheim (DE); Max Schoebinger, Hirschaid (DE); Susanne Schmolke, Erlangen (DE); Chris Schwemmer, Forchheim (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 476 days.

(21) Appl. No.: 17/730,539

(22) Filed: Apr. 27, 2022

(65) Prior Publication Data
US 2022/0351832 A1 Nov. 3, 2022

(30) Foreign Application Priority Data
Apr. 30, 2021 (EP) .................................. 21171603

(51) Int. Cl.
| G16H 10/60 | (2018.01) |
| G16H 30/20 | (2018.01) |
| G16H 30/40 | (2018.01) |

(52) U.S. Cl.
CPC ............ *G16H 30/20* (2018.01); *G16H 10/60* (2018.01); *G16H 30/40* (2018.01)

(58) Field of Classification Search
CPC ...................................... G06V 10/82
See application file for complete search history.

(56) References Cited

U.S. PATENT DOCUMENTS

| 10,402,969 | B2 * | 9/2019 | Samset | G06T 7/344 |
| 2015/0149454 | A1 * | 5/2015 | Hieronymus | G06F 16/24578 707/728 |
| 2016/0133078 | A1 * | 5/2016 | Hussain | G06K 19/06028 235/494 |
| 2017/0278241 | A1 * | 9/2017 | Abramoff | G06T 7/0002 |
| 2018/0096497 | A1 * | 4/2018 | Bennett | G06T 5/00 |
| 2019/0164279 | A1 | 5/2019 | Ionasec | |
| 2019/0377984 | A1 | 12/2019 | Ghanta et al. | |
| 2020/0126215 | A1 | 4/2020 | Bronkalla et al. | |
| 2020/0211678 | A1 | 7/2020 | Foley et al. | |
| 2022/0198651 | A1 * | 6/2022 | Prokop | G06T 5/50 |
| 2022/0215065 | A1 * | 7/2022 | Shetty | G06N 5/022 |
| 2022/0301154 | A1 * | 9/2022 | Li | G06N 3/084 |

FOREIGN PATENT DOCUMENTS

| CN | 111312372 A * | 6/2020 | G06K 9/6256 |

* cited by examiner

*Primary Examiner* — Di Xiao
(74) *Attorney, Agent, or Firm* — Harness, Dickey & Pierce, P.L.C.

(57) ABSTRACT

At least one example embodiment provides an improved handling of image data sets of patients.

16 Claims, 2 Drawing Sheets

METHODS FOR OPERATING AN EVALUATION SYSTEM FOR MEDICAL IMAGE DATA SETS, EVALUATION SYSTEMS, COMPUTER PROGRAMS AND ELECTRONICALLY READABLE STORAGE MEDIUMS

CROSS-REFERENCE TO RELATED APPLICATION(S)

The present application claims priority under 35 U.S.C. § 119 to European Patent Application No. 21171603.0, filed Apr. 30, 2021, the entire contents of which are incorporated herein by reference.

FIELD

At least some example embodiments relate to computer-implemented methods for operating an evaluation system for medical image data sets, wherein at least one evaluation algorithm is provided for evaluating a medical image data set to determine at least one evaluation information. At least some example embodiments also relate evaluation systems, computer programs and electronically readable storage mediums.

BACKGROUND

Imaging techniques are nowadays often used for diagnosis, monitoring and aftercare in medicine. An image data set of an imaging region of a patient is acquired and is then evaluated regarding medical concepts, in particular pathological and other anatomical and/or physiological anomalies and features. While, in particular in the past, evaluation was often done purely manually by so-called reading, in particular by a radiologist, with the rise of the number of imaging exams and different specialized imaging techniques, the workload and complexity of the evaluation tasks increase.

Hence, the development of evaluation algorithms working on a computing device to aid medical staff in reading medical image data sets, in particular regarding diagnosis, is an active field of research. Such evaluation algorithms use input data comprising at least one image data set to generate output data describing evaluation results, in particular physical features depicted in and/or derivable from the image data set. Recently, more evaluation algorithms based on artificial intelligence have been proposed, for example comprising a neural network. Such artificial intelligence evaluation algorithms work on training data comprising image data sets with associated ground truths regarding the output data, for example respective annotations made in a manual evaluation by a physician.

SUMMARY

Many evaluation algorithms require large amounts of computational resources and their use is time-consuming. In some cases, it has even been proposed to provide the algorithms as an, in particular paid, service on a server or cloud device, such that the image data need to be sent over a communication line, further producing traffic. However, evaluation algorithms may also fail to produce correct or usable evaluation results. For example, if an evaluation algorithm has been trained regarding a certain type of image data set, it may not function well when image data set properties differ. Furthermore, the image quality may not be sufficient and/or the relevant features to be evaluated may not be present. In such cases, the image evaluation using the evaluation algorithm yields no valuable information and can be considered wasted effort.

At least one example embodiment provides an improved handling of image data sets of patients, on particular providing consistent processing and/or avoiding unnecessary effort and cost.

This object is achieved by providing a computer-implemented method, an evaluation system, a computer program, and an electronically readable storage medium according to the independent claims. Advantageous embodiments are described in the dependent claims.

At least one example embodiments provides a computer-implemented method for operating an evaluation system for medical image data sets, the method comprising receiving at least one input set comprising at least one image data set of a patient and at least one evaluation algorithm; evaluating, using at least on evaluation algorithm, a medical image data set to determine at least one evaluation information, wherein for each evaluation algorithm, requirement information comprising requirements regarding at least one of a quality or a content of image data to be evaluated is provided or determined, the evaluating including, analyzing each image data set of each input set to determine a suitability information regarding each evaluation algorithm of the input set, the suitability information indicating at least fulfilment or non-fulfilment of the requirements of the corresponding requirement information, at least one of (i) forwarding for evaluation to at least one corresponding evaluation algorithm only at least one image data set, whose suitability information indicates fulfilment of the requirements of the requirement information of the at least one corresponding evaluation algorithm, or (ii) executing at least one of at least one user information action or image processing action for at least one evaluation algorithm of each input set whose associated suitability information all indicate non-fulfilment of the requirements of the requirement information.

According to at least one example embodiment, at least one image data set of at least one input set comprises meta information, and the meta information is, in addition to the image data, used to determine the suitability information.

According to at least one example embodiment, at least one of the medical image data sets of an input set or the evaluation algorithms to be applied are automatically determined from at least one of an electronic health record or a picture archiving and communications system (PACS) entry of the respective patient, wherein, for each evaluation algorithm not manually chosen to the input set and for which the requirements for at least one of the medical image data sets of the input set are fulfilled, a proposal information proposing use of this evaluation algorithm is output and the image data set is forwarded only if approving user input is received.

According to at least one example embodiment, the suitability information includes at least one suitability measure describing a degree of suitability of the image data set as input data for the evaluation algorithm.

According to at least one example embodiment, at least one of if multiple medical image data sets fulfil the requirements of an evaluation algorithm according to the suitability information, only the at least one image data set associated with the highest suitability measure is forwarded to the evaluation algorithm, or if an image data set fulfils the requirements of multiple evaluation algorithms all yielding a required evaluation information, the image data set is forwarded to the evaluation algorithm for which the suitability measure is highest.

According to at least one example embodiment, for each image data set, image information describing the at least one of the quality or the content of the image data set is determined by analysis of the image data set and, for each input set, the image information of each image data set is compared to the requirement information of each evaluation algorithm of the input set to determine the suitability information.

According to at least one example embodiment, at least one image property is determined as a quality parameter of the image information.

According to at least one example embodiment, during the analyzing, at least one of a presence or a strength of at least one type of artifacts is determined by at least one artifact detection algorithm as a part of the image information.

According to at least one example embodiment, a presence of at least one feature to be further analyzed by at least one evaluation algorithm is detected during the analyzing, and at least one requirement of the requirement information of this evaluation algorithm is based on the presence of the feature.

According to at least one example embodiment, at least one additional requirement information regarding the at least one of the quality or the content of image data to be evaluated manually to achieve the evaluation purpose of at least one of the at least one evaluation algorithm is provided, wherein, if, for at least one evaluation algorithm of each input set having an additional requirement information associated therewith, the associated suitability information all indicate non-fulfilment of the requirements of the requirement information, the image information is compared to the additional requirement information to determine additional suitability information for each image data set, wherein, if the additional suitability information of at least one of the at least one image data set indicates fulfilment of the requirements of the additional requirement information, a notification triggering manual evaluation of this image data set is output as the action, and else a notification triggering acquisition of a new image data set is output as the action.

According to at least one example embodiment, at least one image processing action comprises, postprocessing, to increase at least one quality parameter, of the at least one image data set, or re-reconstruction of the at least one image data set from raw data using modified reconstruction parameters to determine at least one updated image data set, for which an updated suitability information regarding the at least one evaluation algorithm is determined.

According to at least one example embodiment, the at least one evaluation algorithm is provided on a remote server, wherein image data sets to be evaluated are sent to the remote server.

According to at least one example embodiment, an evaluation system for medical image data sets, wherein at least one evaluation algorithm is provided in an evaluation unit for evaluating a medical image data set to determine at least one evaluation information, the system comprising a first interface configured to receive, for each evaluation algorithm, requirement information comprising requirements regarding at least one of a quality or a content of image data to be evaluated; a second interface configured to receive at least one input set comprising at least one image data set of a patient and at least one of the at least one evaluation algorithm to be applied; an analysis unit configured to analyze each image data set of each input set to determine a suitability information regarding each evaluation algorithm of the input set, the suitability information indicating at least fulfilment or non-fulfilment of the requirements of the corresponding requirement information; and a decision unit configured to at least one of forward at least one image data set, whose suitability information indicates fulfilment of the requirements of the requirement information, for evaluation by the corresponding evaluation algorithm to the evaluation unit, or execute at least one user information action and/or image processing action for at least one evaluation algorithm of each input set whose associated suitability information all indicate non-fulfilment of the requirements of the requirement information.

According to at least one example embodiment, a computer program, when executed, causes a computing device of an evaluation system to perform a method according example embodiments.

According to at least one example embodiment, an electronically readable storage medium stores the computer program.

According to at least one example embodiment, an evaluation system for medical image data sets comprises processing circuitry configured to execute computer-readable instructions to cause the evaluation system to receive, for each of at least one evaluation algorithm, requirement information comprising requirements regarding at least one of a quality or a content of image data to be evaluated, receive at least one input set comprising at least one image data set of a patient and at least one of the at least one evaluation algorithm to be applied, analyze each image data set of each input set to determine a suitability information regarding each evaluation algorithm of the input set, the suitability information indicating at least fulfilment or non-fulfilment of the requirements of the corresponding requirement information, and at least one of forward at least one image data set, whose suitability information indicates fulfilment of the requirements of the requirement information, for evaluation by the corresponding evaluation algorithm, or execute at least one user information action and/or image processing action for at least one evaluation algorithm of each input set whose associated suitability information all indicate non-fulfilment of the requirements of the requirement information.

BRIEF DESCRIPTION OF THE DRAWINGS

Other objects and features of example embodiments will become apparent from the following detailed description considered in conjunction with the accompanying drawings. The drawings, however, are only principle sketches designed solely for the purpose of illustration and do not limit example embodiments. The drawings show.

DETAILED DESCRIPTION

Figure 1:
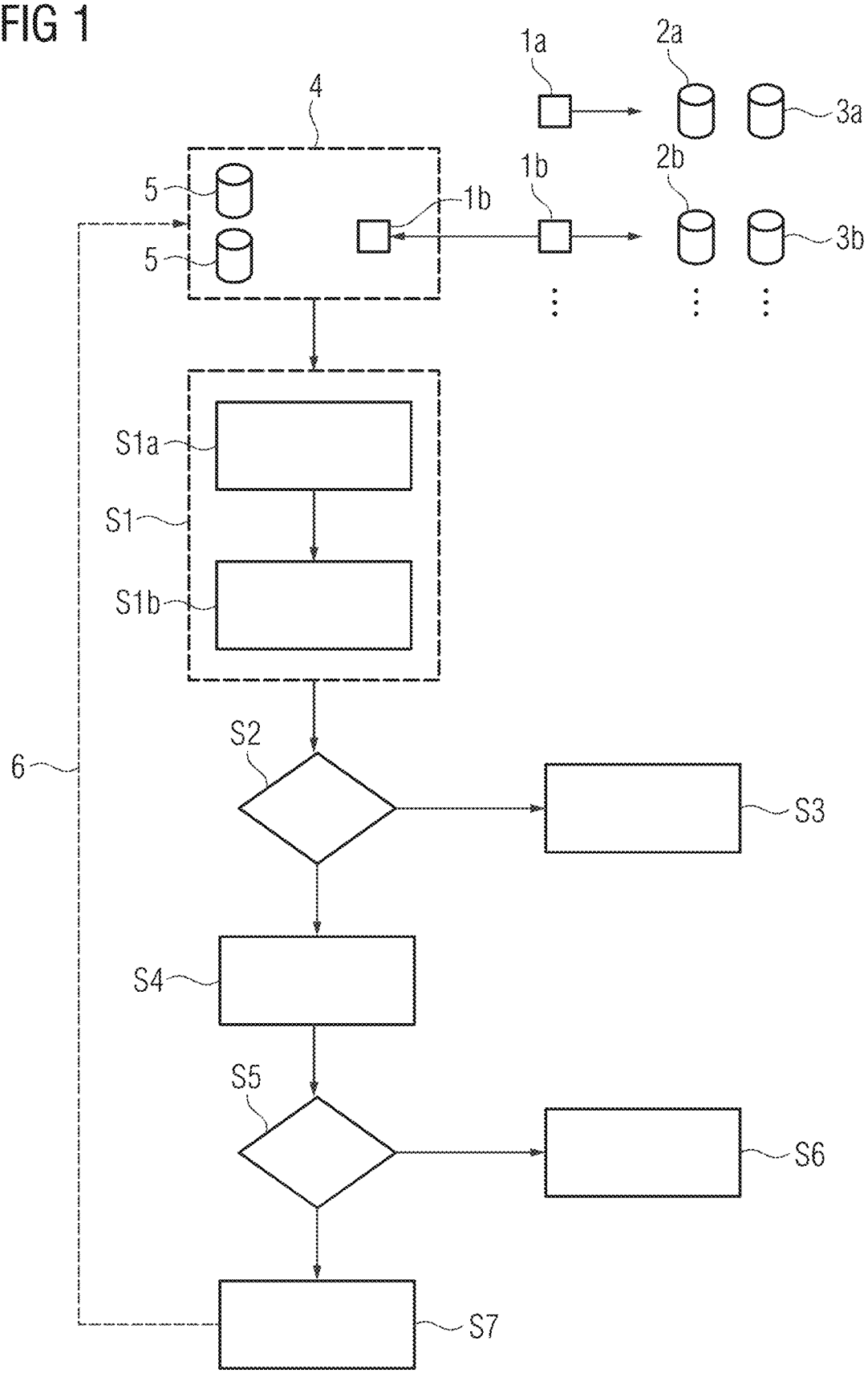
FIG. 1 a flow chart for an embodiment of a method, and
 FIG. 2 an embodiment of an evaluation system.

In a computer-implemented operating method as initially described, according to at least one example embodiment,
 for each evaluation algorithm, requirement information comprising requirements regarding the quality and/or the content of image data to be evaluated is provided or determined,
 at least one input set comprising at least one image data set of a patient and at least one of the at least one evaluation algorithm to be applied is received,
 each image data set of each input set is analyzed to determine a suitability information regarding each evaluation algorithm of the input set, the suitability information indicating at least fulfilment or non-fulfilment of the requirements of the corresponding requirement information, only at least one image data set, whose suitability information indicates fulfilment of the requirements of the requirement information of at least one corresponding evaluation algorithm, is forwarded for evaluation to the corresponding evaluation algorithm and/or at least one user information action and/or image processing action is executed for at least one evaluation algorithm of each input set whose associated suitability information all indicate non-fulfilment of the requirements of the requirement information.

At least one example embodiment provides an evaluation system for medical image data sets, wherein at least one evaluation algorithm is provided in an evaluation unit for evaluating a medical image data set to determine at least one evaluation information, the evaluation system comprising:

a first interface for receiving, for each evaluation algorithm, requirement information comprising requirements regarding the quality and/or the content of image data to be evaluated, a second interface for receiving at least one input set comprising at least one image data set of a patient and at least one of the at least one evaluation algorithm to be applied, an analysis unit analyzing each image data set of each input set to determine a suitability information regarding each evaluation algorithm of the input set, the suitability information indicating at least fulfillment or non-fulfillment of the requirements of the corresponding requirement information, a decision unit for
forwarding at least one image data set, whose suitability information indicates fulfillment of the requirements of the requirement information, for evaluation by the corresponding evaluation algorithm to the evaluation unit and/or
executing at least one user information action and/or image processing action for at least one algorithm of each input set whose associated suitability information all indicate non-fulfilment of the requirements of the requirement information.

The methods and systems described here may be applied to single provided evaluation algorithms, but are preferably used in a system where multiple different evaluation algorithms are provided, for example relating to a certain imaging region, a certain anatomical region, a certain imaging modality, a certain imaging technique and/or a certain class of medical concepts. For example, all evaluation algorithms may relate to coronary imaging, for example to both coronary computed tomography angiography (CCTA) and calcium scoring imaging (CaSc). In other examples, liver imaging or diffusion magnetic resonance imaging (MRI) may be additional or alternative fields of application. It is, of course, also conceivable to provide evaluation algorithms regarding the whole patient and/or different imaging modalities.

Generally, an evaluation algorithm analyzes the image content of an image data set to derive evaluation information regarding at least one medical concept from imaged, that is physically existent, features of the patient in the imaging region covered by the image data set. Medical concepts may, for example, comprise pathological and other anatomical and/or physiological anomalies and features. For example, an evaluation algorithm may be a lesion detection algorithm, for example regarding lesions in a coronary vessel tree of a patient. In another example, a substance in the imaging region may be quantified, for example a contrast agent, sodium, or calcium. The evaluation algorithm may or may not comprise a trained function, for example at least one neural network, which has been trained by machine learning. For example, at least one evaluation algorithm may be or comprise a deep neural network, in particular a convolutional neural network (CNN).

The input set usually refers to a patient and may comprise one or more image data sets of the patient, for example multiple image data sets acquired in the course of an examination or correlated examination series. For example, the image data sets may comprise computed tomography data sets acquired during at least one coronary examination. Further, the input set comprises at least one identification of an evaluation algorithm to be applied, in particular associated to a subgroup of the image data sets.

At least some example embodiments do not simply apply certain, in particular manually chosen or automatically associated, evaluation algorithms to image data sets, but add a further, upstream analysis step which determines and judges the technical content of the image data sets with regard to at least one evaluation algorithm. In particular, it is at least checked whether an evaluation algorithm and an image data set are suitable for each other, and preferably further advantageous action may be taken. The additional analysis can be understood as an, in particular multi-step, decision support.

Basically, the suitability information allows to identify image data sets not suitable for evaluation by a certain evaluation algorithm, such that additional effort, in particular computational cost and/or data traffic, may be reduced by preventing the unsuitable image data sets from being evaluated by the corresponding evaluation algorithm. This can be done automatically, in particular involving no physician effort. In this manner, dependence on skill and/or availability of a physician, in particular a radiologist, can be prevented. Unnecessary cost and effort for performing unnecessary advanced image analysis, which does not lead to additional evaluation information of clinical relevance, in particular when using external analysis services, can be avoided, shortening the time to adequate treatment.

Example embodiments allow consistent processing, such that certain standards regarding quality and content can be expected if certain evaluation algorithms are to be applied.

It is, again, noted that the method according to at least some example embodiments is not limited to certain, defined cases in which it is already manually planned to perform a certain advanced analysis on image data. The decision support introduced by example embodiments may also provide for automatic decision support regarding which advanced analysis is to be applied to which image data sets and/or what the most appropriate advanced analysis method for a patient would be. In other words, as will be further described below, the methods and systems according to example embodiments may be employed to identify patients for whom an advanced analysis could reveal additional evaluation information of clinical relevance, to identify the most appropriate advanced analysis method, that is evaluation algorithm, to determine additional evaluation information of clinical relevance, and to identify appropriate image data sets for performing the advanced analysis, preferably taking into account image acquisition and reconstruction as well as image quality.

In preferred embodiments, not only the image data itself may be analyzed, but also additional available information. In particular, at least one image data set of at least one input set may comprise meta information, in particular in a DICOM format, wherein the meta information is, in addition to the image data, used to determine the suitability information. The DICOM standard is well-known and widely used in medical image data processing, archiving and storing. It allows to add meta information regarding the image data set, for example acquisition parameters, patient information and the like, into the same data structure, that is, the image data set itself. Preferably, this additional meta information is also used during analysis, for example to determine which imaging technique has been used, which contrasts result, which imaging region is shown, which resolution is used and the like.

In preferred embodiments, the image data sets of an input set and/or the evaluation algorithms to be applied are automatically determined from an electronic health record and/or a PACS entry of the respective patient, wherein, in particular, for each evaluation algorithm not manually chosen to the input set and for which the requirement for at least one of the image data sets of the input set are fulfilled, a proposal information proposing use of this evaluation algorithm is output and the image data set is forwarded only if proving user input is received.

Electronic health records and/or picture archiving and communication systems (PACS) serve to provide a data storage for associated information on a patient, for example all resulting image data sets of a certain examination or series of examinations. Other information, in particular patient information, for example suspected diagnoses, may be associated with the image data sets in such data basis, hence allowing to prepare input sets fully automatically. If, for example, a patient had a coronary examination using computer tomography, it can be deduced that algorithms regarding blood flow, coronary lesions and the like may be useful. Different image data sets may also be associated with different evaluation algorithms in advance, such that, for example, a non-contrast computer tomography scan of the coronary region of a patient may be associated with a calcium scoring algorithm and the like. Fully automatically, it is checked whether the respective evaluation algorithms are suitable, that is, whether clinically evaluation information can be expected from advanced analysis. While it is conceivable to automatically initiate application of the corresponding evaluation algorithms, it may, however, be preferred to output respective proposal information to a user first. In this manner, decision support is provided and the user can simply confirm the proposal to have the evaluation algorithm applied to the corresponding image data set.

In especially preferred embodiments, the suitability information may be determined comprising at least suitability measure describing a degree of suitability of the image data set as input data for the evaluation algorithm. Such a suitability measure, for example, a metric describing the relevant image quality regarding the evaluation algorithm, may serve as a basis for further automatical decisions leading to improved quality of the evaluation information.

In particular, if multiple image data sets fulfill the requirements of an evaluation algorithm according to the suitability information, only the at least one image data set associated with the highest suitability measure is forwarded to the evaluation algorithm, and/or, if an image data set fulfills the requirements of multiple evaluation algorithms all yielding a required evaluation information, the image data set is forwarded to the evaluation algorithm for which the suitability measure is highest. In other words, image data sets best suited as a basis for advanced analysis by the evaluation algorithm may be chosen such that the highest quality evaluation information can be determined. Furthermore, if multiple evaluation algorithms yield comparable evaluation information, the most suitable and promising evaluation algorithm for a certain image data set may be chosen. In combination, the best pair of image data set and evaluation algorithm for the most promising results of advanced analysis can be chosen. Of course, it is also possible to choose multiple combinations, for example forward the two or three best image data sets to an evaluation algorithm or the like.

In concrete embodiments, for each image data set, image information describing quality and/or content of the image data set is determined by analysis of the image data set and, for each input set, the image information of each image data set is compared to the requirement information of each evaluation algorithm of the input set to determine the suitability information. While the requirement information, for example, may define criteria, for example thresholds and the like, for certain parameters and information items, image information comprising these parameters and/or information items may be determined by technically analyzing the image data set. This allows evaluation of the criteria, such that the suitability information may be determined. The parameters and information items are image properties that are determined by applying respective processes/analysis algorithms.

For example, at least one image property may be determined as a quality parameter of the image information, in particular a signal-to-noise ratio and/or a contrast value and/or a dynamic range and/or an image sharpness.

In an exemplary embodiment, at least one requirement of at least one requirement information may be a minimum quality required for robust evaluation, in particular regarding a certain quality parameter. Of course, other quality parameters may also be used, in particular also quality metrics combining different quality aspects.

During analysis of the at least one image data set, the presence and/or strength of at least one type of artifact may be determined by at least one artifact detection algorithm as a part of the image information. In some evaluation algorithms, some artifacts should not be present or strong when automatically evaluating the image data set. Examples for artifacts are movement artifacts caused by patient motion, for example if the imaging region is subject to heart motion and/or breathing motion. Another source for artifacts may be a patient having a higher heart rate and/or a non-regular heart rate. Movement artifacts may, however, also occur in the imaging device used to acquire the image data set. For example, in an X-ray device, the detector and/or the X-ray source are often moved. In the state of the art, artifact detection algorithms have been proposed that are able to detect the presence of such artifacts, which may be relevant for evaluation algorithms. Respective image artifact information may be added to the image information.

It is noted that image quality may also be influenced by events happening during acquisition. If, for example, a contrast agent is used and the timing is off, not enough contrast agent may be in the imaging region, such that the contrast may be too low.

Problems regarding image data sets may also arise during reconstruction from raw data. For example, if computer tomography data sets are reconstructed from projection data, reconstruction kernels may be used which influence image properties, for example image sharpness. Finally, problems meeting the requirements may result from user choices, for example regarding resolution and/or slice thickness.

However, not only image quality may influence suitability for advanced analysis by an evaluation algorithm, but also image content. For example, if the evaluation algorithm analyzes certain, in particular medical, features, these features should be sufficiently distinguishable in the image data set. Hence, in embodiments, the presence of at least one, in particular medical, feature to be further analyzed by at least one evaluation algorithm is detected during analysis of the at least one image data set, wherein at least one requirement of the requirement information of this evaluation algorithm demands presence of the feature. In particular, such an analysis may also relate to the complete depiction of the feature by the image data set. Such a check is, in particular, important, if the feature cannot be easily discerned by the human eye, for example, in functional imaging. In embodiments, the feature may also relate to a pathology. In many cases, the pure presence of some pathology can be detected with a low expenditure, while the evaluation algorithm detailedly analyzes the pathology, for example, a lesion. If no relevant pathology is contained in an image data set, advanced analysis regarding this pathology also makes no sense, such that the operating methods according to example embodiments may prevent such image data sets from being forwarded to the respective evaluation algorithms.

In an especially preferred embodiment, at least one additional requirement information regarding the quality and/or the content of image data to be evaluated manually to achieve the evaluation purpose of at least one of the at least one evaluation algorithm may be provided, wherein, if, for at least one algorithm of each input set having an additional requirement information associated therewith, the associated suitability informations all indicate non-fulfillment of the requirements of the requirement information, the image information is compared to the additional requirement information to determine additional suitability information for each image data set, wherein, if the additional suitability information of at least one of the at least one image data set indicates fulfillment of the requirements of the additional requirement information, a notification triggering manual evaluation of this image data set is output as the action, and else a notification triggering acquisition of a new image data set is output as the action.

In other words, in this embodiment, there may be three outcomes regarding further analysis and evaluation of acquired image data sets. If the suitability information regarding an evaluation algorithm to be used indicates that the image quality and content are good enough to use the algorithm, advanced analysis may be automatically performed by the evaluation algorithm. However, even if the image quality and/or content may not suffice for the automatic advanced analysis by the evaluation algorithm, manual reading of the image data set may still provide relevant clinical results. Hence, if the suitability information regarding the evaluation algorithm indicates non-suitability, a second check is performed using additional requirement information regarding manual evaluation, such that an additional suitability information results. If the additional suitability information indicates suitability for manual reading of the image data set, the image data set may be forwarded to manual evaluation, for example queued and output to a radiologist. If, however, regarding a certain evaluation purpose, no image data set is found suitable for either an evaluation algorithm or manual reading, re-acquisition may be triggered since the image data are clinically useless. However, the results of the analysis may, also in this case, be put to use, since control information regarding the re-acquisition may be generated depending on the suitability information and used to control the corresponding imaging device. In this manner, the re-acquisition can be adapted to generate an image data set better suiting the requirements. Generally, in such an embodiment, by technically analyzing and judging image data sets, decision support is provided which allows the best use of any acquired image data set.

As already described, the action may be a user information action, for example triggering manual reading or re-acquisition or simply marking an image data set as not suitable or advanced analysis (and/or manual reading). Additionally, if re-acquisition is to be performed, control information may additionally be sent to the imaging device. However, in embodiments, also image processing actions may be triggered, in particular in addition to user information actions, for example asking for a confirmation, wherein such image processing actions may try to modify and/or improve the image data set to fulfill the requirements of at least one requirement information. In a concrete embodiment, at least one image processing action comprises post processing, in particular to increase at least one quality parameter, of at least one of the at least one image data set and/or re-reconstruction of at least one of the at least one image data set from raw data using modified reconstruction parameters to determine at least one updated image data set, for which an updated suitability information regarding the at least one evaluation algorithm is determined. Such image processing actions may, for example, comprise denoising, edge sharpening, artifact reduction and the like. If raw data are still available, advantageously, re-reconstruction may be triggered, if, for example, a different reconstruction kernel and/or different reconstruction parameters may lead to more suitable results regarding image quality and/or content.

In preferred embodiments, the at least one evaluation algorithm may be provided on a remote server, wherein image data sets to be evaluated are sent to the remote server. In such a configuration, by re-sorting image data sets as suitable or not suitable, not only computational effort and, optionally, monetary cost, can be reduced, but also communication traffic.

In an example, the at least one evaluation algorithm may comprise a coronary computed tomography angiography algorithm and/or a calcium scoring algorithm, wherein the image data sets are computed tomography data sets of an imaging region comprising the heart of the patient. In this context, for example, multiple image data sets may be acquired showing no contrast agent and/or different image data sets may comprise data acquired at different heart phases. For example, if multiple image data sets corresponding to different heart phases, that is, different intervals during the heart cycle, are provided in the input set, the image data set and thus heart phase best suited for a certain evaluation algorithm may be determined and chosen for advanced analysis.

All features and comments regarding the methods according to example embodiments apply to the evaluation systems according to example embodiments. The evaluation system may comprise at least one processor and/or at least one storage. The functional units may be implemented in software and/or hardware, in particular software running on the at least one processor. Further functional units may, of course, be provided to realize advantageous embodiments of the method.

A computer program according to at least one example embodiment can be directly loaded into an evaluation system and performs, if executed on a computing device of the evaluation system, the steps of a method according to example embodiments. The computer program may be stored on an electronically readable storage medium according to example embodiments, which hence comprises control information comprising at least one computer program according to example embodiments, such that, when the electronically readable storage medium is used in an evaluation system, the evaluation system performs the steps of a method according to example embodiments. The electronically readable storage medium may be a non-transitory medium, for example a CD-ROM.

FIG. 1 is a flow chart of an embodiment of a method for operating an evaluation system. In the evaluation system, multiple evaluation algorithms are provided on a remote server to derive evaluation information from medical image data sets. The evaluation algorithms may or may not comprise trained functions of artificial intelligence, for example neural networks. In a concrete example, the evaluation algorithms may be configured to provide evaluation information regarding the coronary blood vessel tree of a patient, for example evaluation information regarding lesions, a calcium score and the like. For these evaluation algorithms to robustly yield high-quality evaluation information that is of clinical relevance, the image data set to be evaluated must fulfil certain requirements regarding quality and/or content.

In FIG. 1, the evaluation algorithms 1a, 1b, . . . are schematically indicated. For each evaluation algorithm provided in the evaluation system, requirement information 2a, 2b, . . . is provided, wherein the requirement information 2a, 2b, . . . describes the above-mentioned requirements regarding quality and/or content of image data sets to be evaluated by the corresponding evaluation algorithm 1a, 1b, . . . . In this embodiment, for each evaluation algorithm 1a, 1b, . . . or at least each group of evaluation algorithms 1a, 1b, . . . yielding the same evaluation information, that is, serving the same evaluation purpose, additional requirement information 3a, 3b, . . . is also provided. The additional requirement information 3a, 3b, . . . defines requirements regarding image quality and/or content required for a successful manual evaluation regarding the same evaluation purpose, i.e. determining the same evaluation information. Requirement information may comprise criteria evaluating certain parameters describing image quality and/or content, for example thresholds for quality parameters and the like.

If the evaluation system, in particular at least one of the evaluation algorithms 1a, 1b, . . . is to be used, an input set 4 is provided at an interface of the evaluation system. The input set 4 comprises at least one image data set 5, wherein, in the example of FIG. 1, for reasons of simplicity two image data sets 5 are shown. The input set 4 further comprises an identification of at least one of the evaluation algorithms 1a, 1b, . . . to be applied to at least one of the image data sets 5. For reasons of a simpler explanation, in this case, only the evaluation algorithm 1b is shown as a part of the exemplary input set 4.

The input set 4 may be manually compiled, but can, at least partly, also be automatically derived. For example, the input set may be derived from a database like a PACS or electronic health records, as well as from DICOM studies. Such data bases may comprise image data sets 5 which have been acquired during an examination of a certain patient and/or a correlated series of examinations of a certain patient. While the image data sets 5 themselves, in particular if they are stored in the DICOM format, may already comprise meta information regarding the image data set 5 and the patient, additional patient information and/or meta information may be available in the data base, such that the purpose of the examination, suspected diagnosis and the like can be derived as well as information like imaging region, patient age, gender and more. Using such additional meta and/or patient information, evaluation algorithms 1a, 1b, . . . yielding useful, clinically relevant information when applied to the corresponding image data set 5 may be automatically chosen into the input set 4. Regarding the image data sets 5, for example, all image data sets 5 of a certain examination and/or series of examinations may be automatically selected.

If the input set 4 is at least partially compiled automatically, the decision support steps further discussed below may not only prevent unsuitable image data sets 5 from being evaluated by evaluation algorithms 1a, 1b, . . . , but is also becomes possible to identify patients for whom an advanced analysis by evaluation algorithms 1a, 1b, . . . could yield additional information of clinical relevance, to identify the most appropriate advanced analysis method to determine evaluation information of clinical relevance, and/or to identify appropriate image data set for performing the advanced analysis.

Every time an input set 4 is received, for each pair of image data set 5 and evaluation algorithm 1b to be applied to it, in step S1 a suitability information is determined. In the embodiment shown in FIG. 1, in a first sub-step S1a, the image data set 5 is analysed and image information describing image quality and/or content is derived. For example, the image information may comprise quality parameters like image sharpness, contrast, signal-to-noise ratio and/or information items like binary indicators of shown anatomical or generally medical features. Preferably, in step S1a, as part of the image information, it is also determined whether certain, in particular medical, features are included in the image data set, for example, whether a lesion and/or other medical concept is shown.

In step S1b, the image information is compared to the requirement information 2b of the respective evaluation algorithm 1b of the pair. For example, criteria can be evaluated. In this embodiment, the suitability information does not only include a binary indicator whether the requirements of the requirement information are fulfilled for the image data set, but also a suitability measure is determined. The suitability measure quantifies the evaluation algorithm-related quality and content of the image data set 5. For example, it can be quantified by how much a threshold for a quality parameter is surpassed and/or different criteria can be weighted to deduce a single value for the suitability measure.

Once the suitability information for all pairs of image data sets 5 and evaluation algorithms 1b of the input set 4 has been determined, in a step S2, it is checked whether suitability informations indicate fulfilment of all requirements of the respective requirement information. If the requirements are fulfilled regarding multiple image data sets 5 and one certain evaluation algorithm 1b, only the image data set 5 having the highest suitability measure is forwarded for evaluation by the evaluation algorithm 1b in a step S3. If, on the other hand, multiple evaluation algorithms 1b having the same evaluation purpose, i.e. yielding the same evaluation information, were included in the input set 4, the pair having the highest suitability measure is selected and the image data set 5 of the pair is forwarded to the evaluation algorithm 1b of the pair. If, of course, the suitability information only indicates fulfilment for one pair of image data set 5 and a certain evaluation algorithm 1b/group of comparable evaluation algorithms 1b, the image data set 5 may simply be forwarded in step S3 without further considering the suitability measure.

If, however, it is determined in step S2 that for at least evaluation algorithm 1b or group of comparable evaluation algorithms 1b serving the same evaluation purpose, no suitability information indicates fulfilment of the requirements, it is proceeded to step S4, wherein respective additional requirement information 3b is used to determine additional suitability information regarding manual reading of image data sets 5. In this embodiment, the image information simply needs to be additionally compared to the additional requirement information 3b, wherein, preferably, an additional suitability measure is determined as part of the additional suitability information.

In a step S5, at least the image data sets 5 for which an additional suitability information has been determined, which indicates fulfilling the requirements for manual reading, are marked for manual reading and respective user information is output as a user information action in step S6.

If, however, all additional suitability informations indicate non-fulfilment of the requirements of the additional requirement information 3b, in step S7, corresponding user information may be output as a user information action. However, in embodiments, also image processing actions may be initiated in step S7, in particular for improving the image quality of at least one image data set 5, which may then be checked again for suitability according to dashed arrow 6. However, it is also possible to trigger re-reconstruction of an image data set 5 and/or even re-acquisition such that a completely new medical image data set 5 results and can be checked for suitability regarding advanced analysis. In this context, control information comprising acquisition parameters contributing to suitability may be generated and sent to an imaging device, where it may be used to control the re-acquisition process, increasing the probability to generate an image data set 5 suitable for advanced analysis by one of the evaluation algorithms 1a, 1b, . . . .

It is noted that, in case an updated image data set 5 is to be generated by an image processing action, confirmation from a user may be requested. Such confirmation may also be requested if, for example, an evaluation algorithm 1a, 1b, . . . and/or an image data set 5 not explicitly manually chosen is to be used in step S3. Hence, before forwarding the image data set 5 to the respective evaluation algorithm 1a, 1b, proposal information may be output and approving or disapproving user input may be received.

Figure 2:
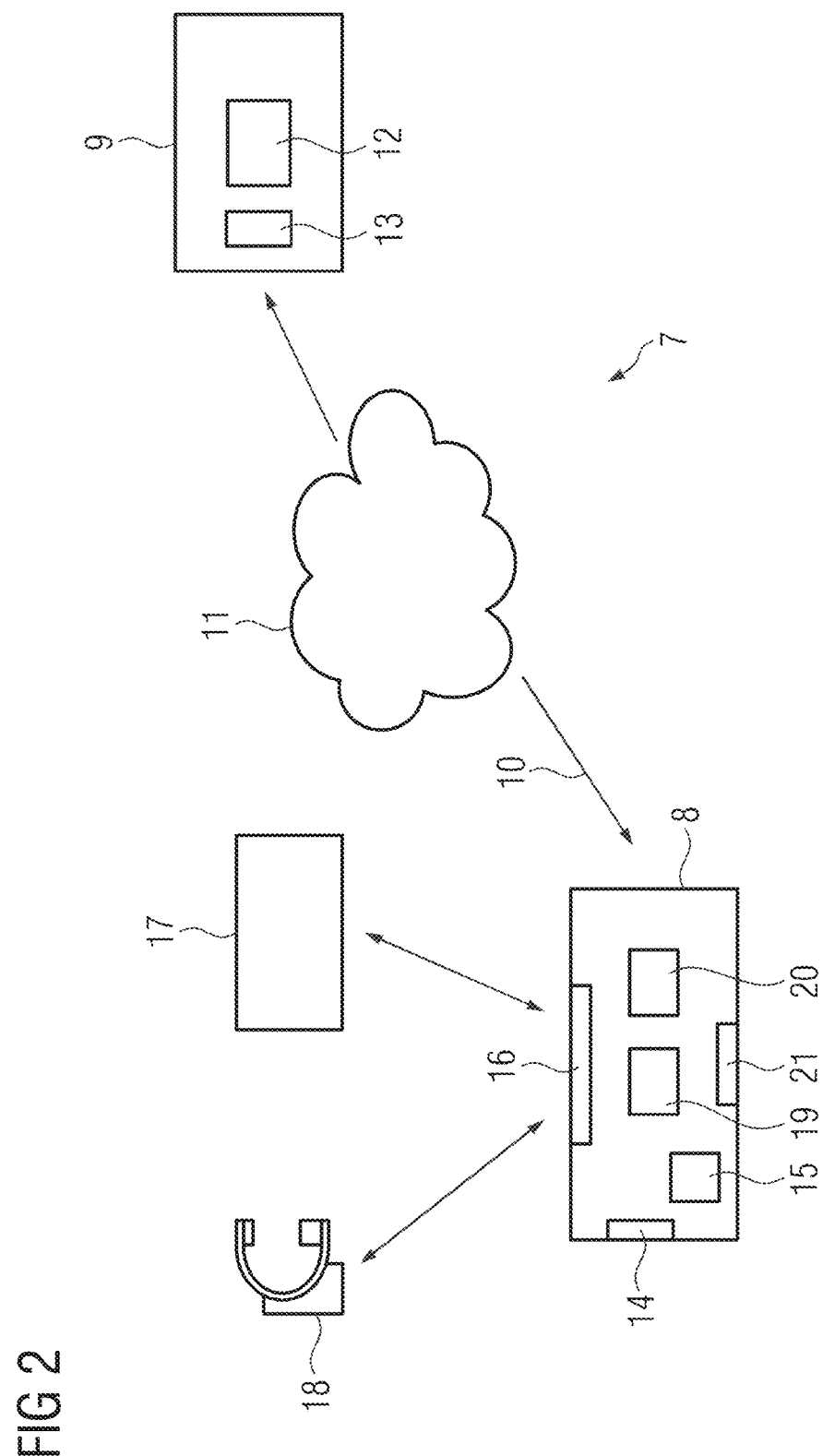

FIG. 2 shows a principle, functional drawing of an evaluation system 7 according to at least one example embodiment. The evaluation system 7 comprises a local computing device 8 which may be positioned at a medical facility. The computing device 8, which comprises at least one processor and at least one storage medium, is connected to a remote server 9, which may be a server device and/or a cloud device, via a communication link 10, in particular via the internet 11. The remote server 9 comprises an evaluation unit 12 where the evaluation algorithms 1a, 1b, . . . , which are stored in a respective storage medium 13, may be applied.

A local computing device 8 comprises a first interface 14, where requirement information 2a, 2b, . . . and additional requirement information 3a, 3b, . . . may be provided, for example from the remote server 9. The requirement information, 2a, 2b, . . . and 3a, 3b, . . . may be stored in a storage medium 15 of the computing device 8. Via a second interface 16, input sets 4 may be received, for example from a PACS 17 and/or directly from an imaging device 18. In an analysis unit 19, suitability information may be determined according to step S1, while in a decision unit 20, the decision process of steps S2 to S7 may be executed, in particular including the respective actions in steps S3, S6 and S7.

If, in step S3, an image data set 5 is forwarded to the evaluation unit 12 for respective processing by the respective evaluation algorithm 1a, 1b, . . . , the resulting evaluation information may be sent via the communication link 10 to the computing device 8 and output via a third interface 21. It is noted that the third interface 21 may be at least partly integrated into the second interface 16 such that the evaluation information may be sent to the PACS 17 and/or the imaging device 18 for display and/or storing.

The computing device 8 may be part of an image reading work station also having an input and an output, such that, preferably, evaluation information can be displayed, manual reading may be alternatively or additionally performed, user information can be output and/or user input can be received.

Although example embodiments have been described in detail with reference to the preferred embodiments, example embodiments are not limited by the disclosed examples from which the skilled person is able to derive other variations without departing from the scope of example embodiments.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without subdividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The invention claimed is:

1. A computer-implemented method for operating an evaluation system for medical image data sets, the method comprising:
   receiving at least one input set comprising at least one image data set of a patient and at least one evaluation algorithm; and
   evaluating, using the at least one evaluation algorithm, the at least one image data set to determine at least one evaluation information, wherein for each evaluation algorithm, requirement information including requirements regarding a quality of image data and a content of image data to be evaluated is provided or determined, the evaluating including,
      analyzing each image data set of each input set to determine a suitability information regarding each evaluation algorithm of the input set, the suitability information indicating at least fulfilment or non-fulfilment of the requirements of the corresponding requirement information, and at least one of,
(i) forwarding for evaluation to the at least one evaluation algorithm only at least one image data set whose suitability information indicates fulfilment of the requirements of the requirement information of the at least one evaluation algorithm, or
(ii) executing at least one of at least one user information action or image processing action for at least one evaluation algorithm of each input set whose associated suitability information all indicate non-fulfilment of the requirements of the requirement information,
wherein at least one of the at least one image data set of an input set or the at least one evaluation algorithm to be applied are automatically determined from at least one of an electronic health record or a picture archiving and communications system (PACS) entry of the respective patient.

2. The method according to claim 1, wherein at least one image data set of at least one input set comprises meta information, and the meta information is, in addition to the image data, used to determine the suitability information.

3. The method according to claim 1, wherein, for each evaluation algorithm not manually chosen to the input set and for which the requirements for at least one of the medical image data sets of the input set are fulfilled, a proposal information proposing use of this evaluation algorithm is output and the image data set is forwarded only if approving user input is received.

4. The method according to claim 1, wherein the suitability information includes at least one suitability measure describing a degree of suitability of the image data set as input data for the evaluation algorithm.

5. The method according to claim 4, wherein, at least one of
if multiple medical image data sets fulfil the requirements of an evaluation algorithm according to the suitability information, only the at least one image data set associated with a highest suitability measure is forwarded to the evaluation algorithm, or
if an image data set fulfils the requirements of multiple evaluation algorithms all yielding a required evaluation information, the image data set is forwarded to the evaluation algorithm for which the suitability measure is highest.

6. The method according to claim 1, wherein, for each image data set, image information describing the at least one of the quality or the content of the image data set is determined by analysis of the image data set and, for each input set, the image information of each image data set is compared to the requirement information of each evaluation algorithm of the input set to determine the suitability information.

7. The method according to claim 6, wherein at least one image property is determined as a quality parameter of the image information.

8. The method according to claim 6, wherein during the analyzing, at least one of a presence or a strength of at least one type of artifacts is determined by at least one artifact detection algorithm as a part of the image information.

9. The method according to claim 6, wherein a presence of at least one feature to be further analyzed by at least one evaluation algorithm is detected during the analyzing, and at least one requirement of the requirement information of this evaluation algorithm is based on the presence of the feature.

10. The method according to claim 6, wherein at least one additional requirement information regarding the at least one of the quality or the content of image data to be evaluated manually to achieve an evaluation purpose of at least one of the at least one evaluation algorithm is provided, wherein,
if, for at least one evaluation algorithm of each input set having an additional requirement information associated therewith, the associated suitability information all indicate non-fulfilment of the requirements of the requirement information, the image information is compared to the additional requirement information to determine additional suitability information for each image data set, wherein,
if the additional suitability information of at least one of the at least one image data set indicates fulfilment of the requirements of the additional requirement information, a notification triggering manual evaluation of this image data set is output as the at least one user information action or image processing action, and else a notification triggering acquisition of a new image data set is output as the at least one user information action or image processing action.

11. The method according to claim 6, wherein at least one image processing action comprises,
postprocessing, to increase at least one quality parameter, of the at least one image data set, or
re-reconstruction of the at least one image data set from raw data using modified reconstruction parameters to determine at least one updated image data set, for which an updated suitability information regarding the at least one evaluation algorithm is determined.

12. The method according to claim 6, wherein the at least one evaluation algorithm is provided on a remote server, wherein image data sets to be evaluated are sent to the remote server.

13. A computer program, when executed, causes a computing device of an evaluation system to perform the method according to claim 1.

14. An electronically readable storage medium, on which a computer program according to claim 13 is stored.

15. An evaluation system for medical image data sets, wherein at least one evaluation algorithm is provided in an evaluation unit for evaluating a medical image data set to determine at least one evaluation information, the evaluation system comprising:
at least one memory configured to store instructions; and
at least one processor configured to execute the instructions and cause the evaluation system to
receive, for each evaluation algorithm, requirement information comprising requirements regarding a quality of image data and a content of image data to be evaluated;
receive at least one input set comprising at least one image data set of a patient and at least one of the at least one evaluation algorithm to be applied;
analyze each image data set of each input set to determine a suitability information regarding each evaluation algorithm of the input set, the suitability information indicating at least fulfilment or non-fulfilment of the requirements of the corresponding requirement information; and at least one of
forward at least one image data set, whose suitability information indicates fulfilment of the requirements of the requirement information, for evaluation by the corresponding evaluation algorithm to the evaluation unit, or
execute at least one user information action and/or image processing action for at least one evaluation algorithm of each input set whose associated suitability information all indicate non-fulfilment of the requirements of the requirement information, wherein at least one of the at least one image data set of an input set or the at least one evaluation algorithm to be applied are automatically determined from at least one of an electronic health record or a picture archiving and communications system (PACS) entry of the respective patient.

16. An evaluation system for medical image data sets, the evaluation system comprising:

processing circuitry configured to execute computer-readable instructions to cause the evaluation system to, receive, for each of at least one evaluation algorithm, requirement information comprising requirements regarding a quality of image data and a content of image data to be evaluated, receive at least one input set comprising at least one image data set of a patient and at least one of the at least one evaluation algorithm to be applied, analyze each image data set of each input set to determine a suitability information regarding each evaluation algorithm of the input set, the suitability information indicating at least fulfilment or non-fulfilment of the requirements of the corresponding requirement information, and at least one of forward at least one image data set, whose suitability information indicates fulfilment of the requirements of the requirement information, for evaluation by the corresponding evaluation algorithm, or execute at least one user information action and/or image processing action for at least one evaluation algorithm of each input set whose associated suitability information all indicate non-fulfilment of the requirements of the requirement information, wherein at least one of the at least one image data set of an input set or the at least one evaluation algorithm to be applied are automatically determined from at least one of an electronic health record or a picture archiving and communications system (PACS) entry of the respective patient.

\* \* \* \* \*